United States Patent
Balakrishnan et al.

(10) Patent No.: US 9,767,056 B2
(45) Date of Patent: Sep. 19, 2017

(54) METHOD FOR CONTROLLING TRANSACTION EXCHANGES BETWEEN TWO INTEGRATED CIRCUITS

(75) Inventors: Bipin Balakrishnan, Eindhoven (NL); Abdelaziz Goulahsen, Coublevie (FR)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 775 days.

(21) Appl. No.: 14/130,646

(22) PCT Filed: Jul. 6, 2012

(86) PCT No.: PCT/EP2012/063295
§ 371 (c)(1),
(2), (4) Date: Jan. 2, 2014

(87) PCT Pub. No.: WO2013/004825
PCT Pub. Date: Jan. 10, 2013

(65) Prior Publication Data
US 2014/0201406 A1    Jul. 17, 2014

Related U.S. Application Data

(60) Provisional application No. 61/515,173, filed on Aug. 4, 2011.

(30) Foreign Application Priority Data

Jul. 6, 2011    (EP) .................................. 11290315

(51) Int. Cl.
G06F 13/362    (2006.01)
G06F 1/32    (2006.01)
G06F 1/26    (2006.01)

(52) U.S. Cl.
CPC .............. *G06F 13/362* (2013.01); *G06F 1/26* (2013.01); *G06F 1/3203* (2013.01); *G06F 1/3253* (2013.01); *Y02B 60/1235* (2013.01)

(58) Field of Classification Search
CPC ........ G06F 13/362; G06F 1/26; G06F 1/3203; G06F 1/3253
See application file for complete search history.

(56) References Cited

U.S. PATENT DOCUMENTS 6,315,194 B1    11/2001    Graef et al.
6,480,965 B1 *    11/2002    Harriman .............. G06F 1/3203
                                                                              713/322
(Continued)

FOREIGN PATENT DOCUMENTS

CN    1766799 A    5/2006
CN    101198923 A    6/2008
(Continued)

OTHER PUBLICATIONS

Chinese Search Report, issued Sep. 22, 2015, in connection with Chinese Application No. 2012800335714, all pages.
(Continued)

*Primary Examiner* — Henry Tsai
*Assistant Examiner* — John Roche
(74) *Attorney, Agent, or Firm* — Leffler Intellectual Property Law, PLLC

(57) ABSTRACT

Transaction exchanges are controlled between two integrated circuits in a system having the integrated circuits (ICs), a power supply supplying power to a link between the ICs, thereby enabling transaction exchanges between both ICs and a controller controlling the ICs and the power supply. This involves receiving an order at the controller, wherein the order requires the link to be closed. An instruction is sent from the controller to each of the two ICs, wherein the instruction causes each of the ICs to stop initiating new transaction requests. For each one of the ICs, in response to detecting that the one of the two ICs has stopped initiating new transactions, it is detected when all pending transactions initiated by the one of the two ICs have
(Continued)

been executed. The link is closed in response to detecting that all pending transactions of both of the two ICs have been executed.

19 Claims, 4 Drawing Sheets

(56) References Cited

U.S. PATENT DOCUMENTS

| | | | |
|---|---|---|---|
| 6,701,405 B1* | 3/2004 | Adusumilli | G06F 13/28 710/22 |
| 7,529,953 B1 | 5/2009 | Conrad et al. | |
| 2004/0064627 A1* | 4/2004 | Shah | G06F 13/4031 710/310 |
| 2008/0288798 A1* | 11/2008 | Cooper | G06F 1/3228 713/322 |
| 2009/0017863 A1 | 1/2009 | Rowley et al. | |
| 2009/0141654 A1* | 6/2009 | Voutilainen | H04L 12/66 370/254 |
| 2009/0259861 A1 | 10/2009 | Tune | |
| 2013/0031332 A1* | 1/2013 | Bryant | G06F 12/084 711/207 |

FOREIGN PATENT DOCUMENTS

| | | |
|---|---|---|
| CN | 101454741 A | 6/2009 |
| CN | 101901041 A | 12/2010 |
| RU | 2232423 C2 | 7/2004 |
| RU | 2380833 C2 | 1/2010 |
| TW | 476026 B | 2/2002 |
| WO | 0122314 A1 | 3/2001 |
| WO | 2006/138687 A2 | 12/2006 |
| WO | 2006138687 A2 | 12/2006 |

OTHER PUBLICATIONS

PCT Search Report, mailed Sep. 6, 2012, in connection with International Application No. PCT/EP2012/063295, all pages.
MIPI Alliance Specification for Low Latency Interface (LLI), Version 1.0, Jan. 26, 2012, MIPI Alliance, Inc., pp. 1-138.
Russian Office Action, issued Jan. 9, 2017, in connection with Russian Application No. 2014104029/08, 11 pages.
English translation of Russian Office Action, issued Jan. 9, 2017, in connection with Russian Application No. 2014104029/08, 7 pages.
Chinese Office Action, issued Mar. 1, 2017, in connection with Chinese Application No. 201280033571.4, 4 pages.
English translation of Chinese Office Action, issued Mar. 1, 2017, in connection with Chinese Application No. 201280033571.4, 4 pages.

* cited by examiner

METHOD FOR CONTROLLING TRANSACTION EXCHANGES BETWEEN TWO INTEGRATED CIRCUITS

CROSS-REFERENCE TO RELATED APPLICATIONS

This application claims priority under 35 U.S.C. §119 to European Patent Application No. 11290315.8, filed Jul. 6, 2011, which is hereby incorporated herein by reference in its entirety. This application also claims the benefit of U.S. Provisional Application No. 61/515,173, filed Aug. 4, 2011, which is hereby incorporated herein by reference in its entirety.

FIELD OF THE INVENTION

The invention relates to a method for controlling transaction exchanges between two integrated circuits. The invention also concerns a system adapted to carry out the method.

BACKGROUND OF THE INVENTION

System-on-a-chip or system on chip (also known by the acronyms SoC or SOC) refers to integrating all components of a computer or other electronic system into a single integrated circuit (chip). An integrated circuit or monolithic integrated circuit (also referred to as IC, chip, and microchip) is an electronic circuit manufactured by the patterned diffusion of trace elements into the surface of a thin substrate of semiconductor material. It may contain digital, analog, mixed-signal, and often radio-frequency functions—all on a single chip substrate. A typical application is in the area of embedded systems.

In current System on Chip, the different components are interconnected by an on-chip interconnect. An interconnect can basically be construed as a bus for circuitry. Examples of such interconnect are Open Core Protocol (also known by the acronym OCP) or Advanced RISC Machines®'s (also known by the acronym ARM) Advanced eXtensible Interface (also known by the acronym AXI). The components may be Control Processor Units (also known by the acronym CPU). ARM A9 processor core is an example of CPU. Direct memory access (also known by the acronym DMA) engines or peripherals such as Universal Asynchronous Receivers Transmitters (also known by the acronym UARTs) may also be considered as components.

Each component is usually memory mapped. Furthermore, the components exchange transactions between each other.

Such transactions comprise a request sent to another component, wherein this request is executed. As illustrations, the request may be an instruction to read, to write or to fetch from memory. The component that sends the request is a transactions initiator component or initiator component whereas the component that executes the request is a transactions target component or target component. Some components are capable of being both a transactions initiator and a transactions target, while others may be only be a transaction initiator or a transaction target.

Each transaction that is initiated shall have a response that contains either the information requested or status of the original request. As examples, the information requested may be read data while the status may be successful or failed write indications. The response is sent by the target component to the component which initiated the transaction.

In addition to transactions that are sent on the on-chip bus, components also exchange status information such as interrupts. As interrupts are usually side-band signals, on-chip interconnects therefore also contain side-band signals.

Sometimes, all the functionalities needed in a SoC cannot be implemented efficiently in a single die. In such cases, the SoC is split into multiple, usually two. For instance, some components contain analog modules that are designed in a different technology process node while other components are purely digital and can be designed in a smaller process node.

Low Latency Interface (also known by the acronym LLI) may be used to enable such flexible partitioning of a SoC or a system into multiple physical dies while the software implemented in the system considers them as a single logical die. The LLI is standardized in Mobile Industry Processor Interface (also known by the acronym MIPI). LLI is a point to point interface that allows two dies to communicate as if the other die was located on the die considered. LLI is a bi-directional interface made up of dual-simplex sub-links. LLI allows both dies to initiate and to receive transactions simultaneously. In other words, LLI can be thought of as a "bus-extension" or "interconnect tunnel". Through special transactions called "Service transactions", LLI can carry the side-band signals such as interrupts.

In order to efficiently manage the LLI physical link power supply, it is possible to power down the link or put the link into very low power supply states. The physical link requires time to be active when starting from a low power supply state. Such time is usually in the range of milliseconds. As "interconnect tunnel" protocols such as LLI should be able to ensure the low latency while transporting the transactions, it is desirable that all outstanding transactions are completed before the link is put in such low power consumption states or in the extreme case, powered down.

SUMMARY OF THE INVENTION

The object of the present invention is to alleviate at least partly the above mentioned drawbacks.

More particularly, the invention aims to power down the link between two ICs or put the link into very low power supply states in a secure way.

This object is achieved with a method for controlling transaction exchanges between two integrated circuits in a system comprising the two integrated circuits and a power supply for powering a link between the two integrated circuits, thereby enabling transaction exchanges between both integrated circuits. The system also comprises a controller controlling the integrated circuits and the power supply. This can generally be referred to as a link management system. In LLI terminology one chip is called a "System Master" as it will be controlling the LLI IPs (on both chips) and also manage the link. The System Master is equivalent to the controller 40. In FIG. 1, "controller" item 40 points to both ICs for generality. Typically, though, only the master has a controller. In that case, the slave "controller" manages e.g. clock, power and reset in the slave. The master controller 40 could also control the slave by issuing orders to the slave PMU. Once done, the slave PMU reports back to the master PMU.

The method comprises the step of a) receiving an order at the controller to lower an amount of power supplied by the power supply to the link and a step c) of lowering the power supplied to the link once any pending transactions have been executed. In between, there may be a step b) of sending an instruction from the controller to both integrated circuits to prevent the integrated circuits from initiating new transactions.

Embodiments may comprise one or more of the following features:
the order is an order to power down the link.
the link is a circuit-to-circuit serial interface protocol (thus also applicable to parallel interfaces, as they comprise serial connections).
the link is a MIPI Low Latency Interface
at least one of the integrated circuits has an interconnect supplied by an interconnect power supply, which is only used in the transaction exchanges between the two integrated circuits and step c further comprises lowering the power supplied by the interconnect power supply once any pending transactions have been executed.
one integrated circuit is a master integrated circuit and the other integrated circuit is a slave integrated circuit.
the system comprises at least one monitor able to provide a signal representative of a number of pending transactions, the method further comprising a step between step b) and step c) of sending the signal from the monitor to the controller when the number of pending transactions reaches zero.

It is also proposed a system comprising two integrated circuits, a power supply for powering a link between the two integrated circuits, thereby enabling transaction exchanges between both integrated circuits. It is also proposed a controller for controlling the integrated circuits and the power supply. The controller is adapted to send an instruction to both integrated circuits to prevent the integrated circuits from initiating new transactions when receiving an order to lower an amount of power supplied by the power supply to the link and to lower the power supplied to the link once any pending transactions have been executed.

Preferred embodiments comprise one or more of the following features:
the controller is adapted to send an instruction to both integrated circuits to prevent the integrated circuits from initiating new transactions when receiving an order to power down the link and to stop the supply power of the link once any pending transactions have been executed.
the controller is adapted to send an instruction to both integrated circuits to prevent the integrated circuits from initiating new transactions when receiving an order to power down the link.
the controller is adapted to act as the controller in at least one of the method as previously described.

Further features and advantages of the invention will appear from the following description of embodiments of the invention, given as non-limiting examples, with reference to the accompanying drawings listed hereunder.

DETAILED DESCRIPTION OF THE INVENTION

The present invention is related to data transfer system between two ICs and more particularly a method and circuit to deal with the reliable termination of data exchange in such a system. Though the invention is more specifically described for low latency data transfer interfaces such as MIPI LLI, it should be understood that such invention may be used in other applications.

Figure 1:
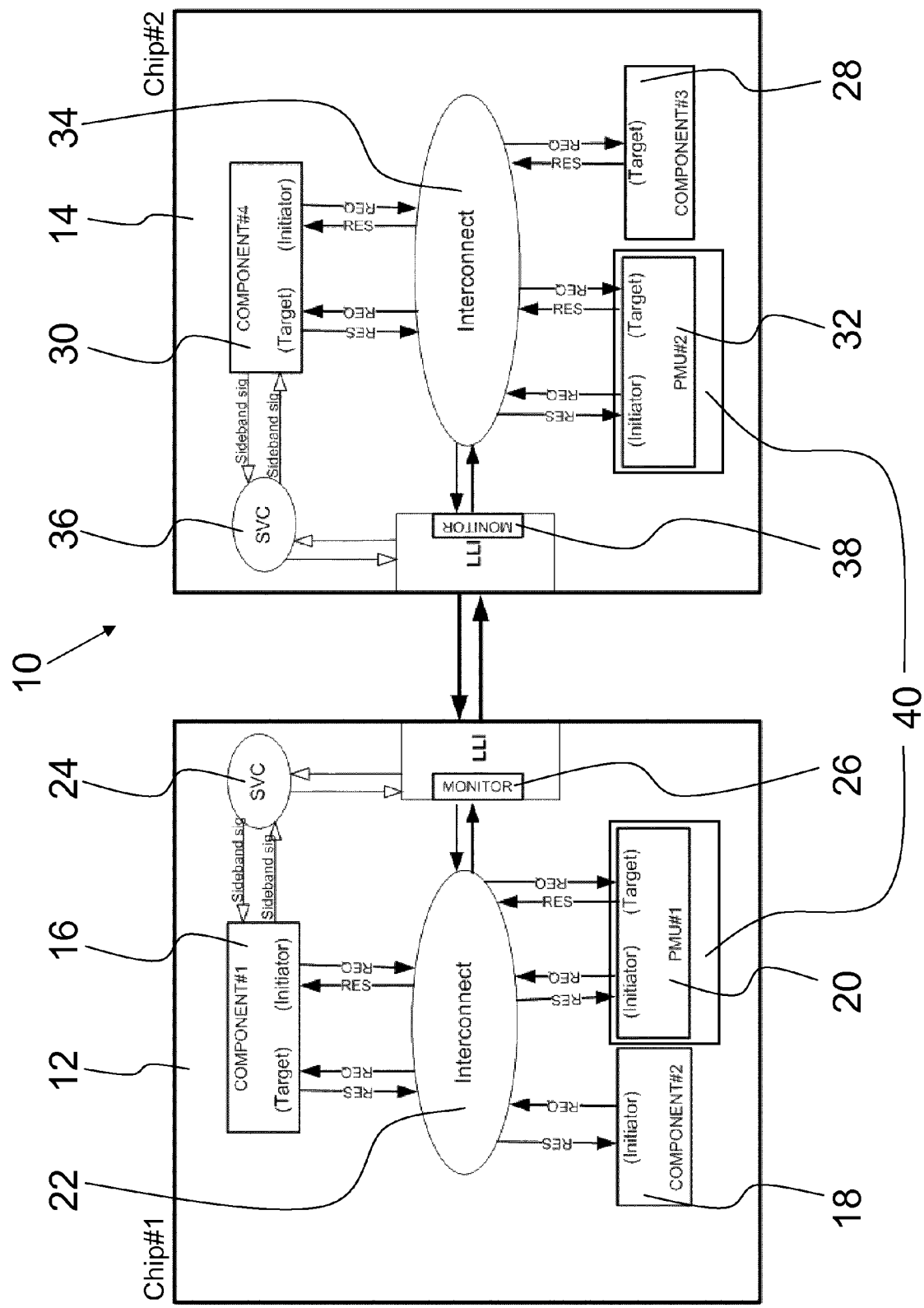
FIG. 1 shows a block diagram of an example of a system partitioned into two separate ICs.

In particular, it is proposed a method for controlling transaction exchanges between two ICs in a system. FIG. 1 is a block diagram of an example of such system partitioned into two separate ICs. The system 10 comprises a first IC 12 which is Chip#1 and a second IC 14 which is Chip#2. Each IC 12 and 14 comprises different components. Examples of components are CPUs or any hardware ("physical implementation" or "intellectual property", also known by the acronym IP) such as DMA. In the example of FIG. 1, the first IC 12 comprises a first component 16 (component #1 on FIG. 1), a second component 18 (component #2 on FIG. 1), a power management unit 20 (also named after its acronym PMU) labelled PMU #1 on FIG. 1, an interconnect 22, a logical block that converts sideband signals into Service Transactions (also known by the acronym SVC) 24 and a monitor 26. The second IC 14 comprises a third component 28 (component #3 on FIG. 1), a fourth component 30 (component #4 on FIG. 1), a power management unit 32 (labelled PMU #2 on FIG. 1), an interconnect 34, a SVC 36 and a monitor 38. PMUs 20 and 32 are components, which are usually part of their respective interconnect 22 and 34. However, for the purpose of illustration, they are explicitly shown on FIG. 1. The different components will be further detailed in the following.

Each component (the four components 16, 18, 28 and 30 and the PMUs 20 and 32) can be an initiator and/or a target of transactions. For the sake of illustration, in the case of FIG. 1, the two components 16 and 30 and the PMUs 20 and 32 are both initiators and targets of transactions while the two components 18 and 28 are only initiators of transactions.

As explained before, transaction may for instance comprise a Read or Write Data Request initiated by an initiator to a target component. The target component executes the request and returns a Read Response (Read Data or an error) or Write Response (successful or error). As described previously and discussed again below, a transaction also comprises a response.

According to the example of FIG. 1, the arrows with the label "REQ" depicts the request path and the arrows with the label "RES" depicts the response path. A transaction is initiated by an initiator through the "REQ" path to the interconnect 22 or 34 according to the IC 12 or 14 considered. An interconnect delivers the transaction to the correct target. This delivery is made thanks to the "REQ" path input and the use of the fact that each component of the IC 12 or 14 is memory mapped in each interconnect 22 and 34. The target executes the read or writes and the resulting response is sent out on the Interconnect through the "RES" path. The interconnect 22 or 34 then carries this response back to the initiator which originated the Transaction. As basic illustration, if the second component 18 initiates a request to the first component 16, the request will pass through the interconnect 22. In addition, when the first component 16 will send its response to the second component 18, the response will also passes through the interconnect 22.

The system 10 also encompasses a power supply for powering a link between the two ICs 12 and 14, the supplying in power of the link enabling transaction exchanges between both ICs 12 and 14. (This power supply or a separate power supply is of course needed in order to power the components on the ICs.) More concretely, this means that, upon providing power to the link, transactions can be made between a component of the first IC 12 and another one of the second IC 14. For instance, the second component 18 may send a request to the fourth component 30, this fourth component 30 answering to the second component 18.

According to the example of FIG. 1, the two ICs 12 and 14 are interconnected by a chip to chip serial interface protocol such as MIPI LLI. However, it should be noticed that the method may apply to any system wherein a "bus extension" concept is used to interconnect two parts of the system. In other words, the method may be implemented in a system wherein there are two interconnected dies. The dies may be interconnected by any method, such as MIPI LLI. Since a parallel interface consists, at least in part, of serial interfaces, the invention of course applies equally to parallel interfaces as well.

In system 10, the interconnect 22 and 34 on each IC 12 and 14 is connected to the interconnect 34 and 22 of the other IC 14 and 12 respectively by a "bus extension" or "interconnect tunnel" protocol such as MIPI LLI. The data exchange between the components occurs at their respective interconnect protocol such as OCP, AMBA®, Network on Chip (also known by the acronym NoC) protocols using memory mapped transactions without any software intervention. LLI is thus a bi-directional link wherein software support is needed only to boot up the link, for error handling, to power down the link . . . and no software intervention is required by both component to exchange transactions. According to the example of FIG. 1, for each IC 12 or 14, interconnect 22 and 34 represents the on-chip interconnects such as OCP, AMBA® and also the Interconnection Adaptation logic which might be required to adapt the on-chip Interconnect protocol transactions to LLI transactions and vice versa. LLI protocol provides Low Latency (also known by the acronym LL) and Best Effort (also known by the acronym BE) traffic classes. The interconnect is responsible for mapping each transaction on LL or BE traffic class. It should be noted that BE traffic class is optional, but if it is supported by an LLI stack, then the LL traffic class also has to be supported. LLI also provides a special set of transactions called "Service Transactions" which are used to tunnel the sideband signals such as interrupts, DMA requests from one IC to another. The logic that ensures the conversion from sideband signals to Service Transactions and vice versa is the element SVC 24 and 36 on FIG. 1. The Service Transactions may also be used to write and/or read from registers in the LLI address space.

In systems which are partitioned into two separate ICs, and notably on separate packages, like system 10 of FIG. 1, one IC may behave as the master IC while the other one is the slave IC. For instance, the first IC 12 may be the master IC and the second IC 14 the slave IC. The master IC 12 is responsible for controlling the slave IC 14. The master IC 12 also manages the overall system memory map so that components on the slave IC 14 are considered as if they were located on the interconnect 22 of the master IC 12. The role of the master IC 12 is also to configure the LLI Link. LLI IP both interacts with the interconnect 22 of the master IC 12 and also with the interconnect 34 of the slave IC 14. Such interactions enable to transmitting and receiving "Requests" and also "Responses" from each interconnect 22 and 34.

The system 10 also comprises a controller 40 controlling the ICs 12 and 14 and the power supply. The power supply is not represented on FIG. 1. The controller 40 comprises both PMUs 20 and 32. Indeed, both PMUs 20 and 32 usually run the software that is responsible for the LLI Link Power management under the supervision from the system master software running on the master IC CPU. The Link Power Management may be achieved in another way.

The monitors 26 and 38 of ICs 12 and 14 in FIG. 1 have the role of keeping track of each transaction that was sent and whether its response was received. The monitor 26 (or 38 of IC 14) may thus be able to provide a signal representative of the number of pending transactions. This signal will be sent to the controller 40 for instance when the number of pending transactions reaches zero. As described previously, the controller 40 then causes a lowering of the power supplied to a respective of the PMUs 20 and 32. It should be understood that the term "to reach" notably encompasses the meaning "to be equal to".

The way the monitors 26 obtain a signal representative of the number of pending transactions may be various. For example, the monitor 26 of IC 12 will keep track of the transactions which were initiated on interconnect 22 and whether each of them get a response back from interconnect 34 located on IC 14. Each monitor can be implemented as a simple up/down counter. In such embodiment, the counter up counts when a transaction request is sent and down counts when a transaction response is received.

Other implementations than the implementation of FIG. 1 are possible. For instance, though the monitors 26 are depicted as a part of the LLI IP, they can be also implemented outside LLI. Similarly, the controller 40 may be outside the ICs 12 and 14.

Figure 2:
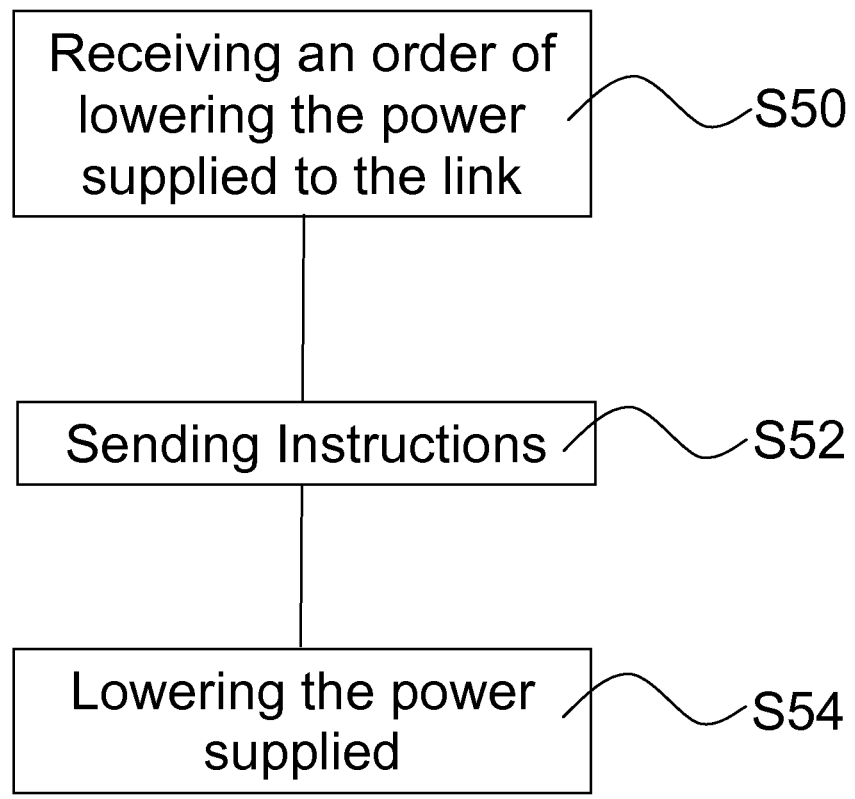
FIG. 2 shows a flowchart of a method for controlling transaction exchanges between the two ICs and in the system.

As shown on FIG. 2 which illustrates a flowchart of the method for controlling transaction exchanges between the two ICs 12 and 14 in the system 10, the method comprises a step S50 of receiving an order at the controller 40 to lower an amount of power supplied by the power supply to the link.

The method further comprises a step S52 of sending an instruction from the controller 40 to both ICs 12 and 14 to prevent the ICs 12 and 14 from initiating new transactions. It should be understood that such sending may be indirect. Indeed, in case both ICs are in relation of master and slave, the controller 40 may send the instructions directly to the master IC 12 and indirectly to the slave IC 14 via the master IC 12.

The method further encompasses a step S54 lowering the power supplied to the link. This lowering is achieved by the controller 40 once the pending transactions have been executed. As described elsewhere, this is not a required step, but is shown here as an exemplary embodiment. Such method is therefore more reliable for the components of the ICs 12 and 14. Indeed, such method enables to put the users of the link in a safe or known state before the data exchange link is closed. Security of the component is therefore improved. In other words, the method ensures a reliable closing of the link.

With such method, data can be exchanged even after a request to lower the supply power is received by the controller 40. This method is easy to implement in so far as no additional external inputs and/or outputs pins are required on the package to carry out the method. This results in cost savings.

In addition such method applies to a lot of systems such as systems wherein the IC are peer-to-peer, systems wherein ICs are in master and slave relationship.

When at step S50, the order is an order to power down the link the above-mentioned effects are even more sensitive. Indeed, in such case, at step S54, the power supply is usually powered down.

Such method can also be used to power down the local IC interconnect if none of the components on that IC has any data to exchange. In that case, the local interconnect is only used in the transaction exchanges between the two integrated circuits. Such local IC interconnect is supplied in power by an interconnect power supply. This interconnect power supply is separate from the power supply for powering the link. Thus, at step S54, the power supplied to the interconnect by the interconnect power supply may also be lowered. The interconnect power supply may even be stopped.

Such method enables to reduce the consumption of power supplied in the system 10.

Figure 3:
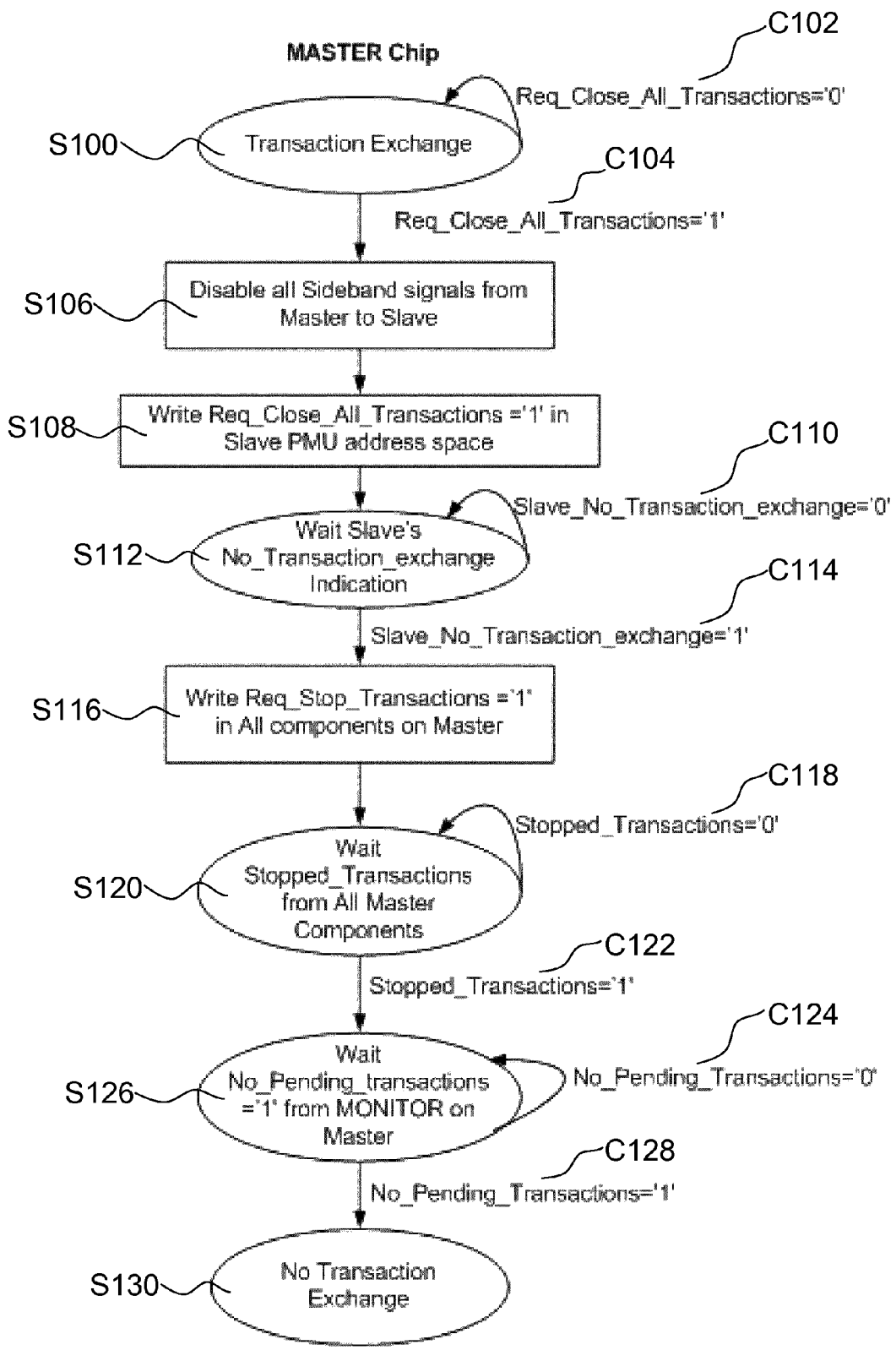
FIGS. 3 and 4 are schematic flowcharts of an example of method used to reliably know that there are no pending transactions initiated either from an IC or the other.
Figure 4:
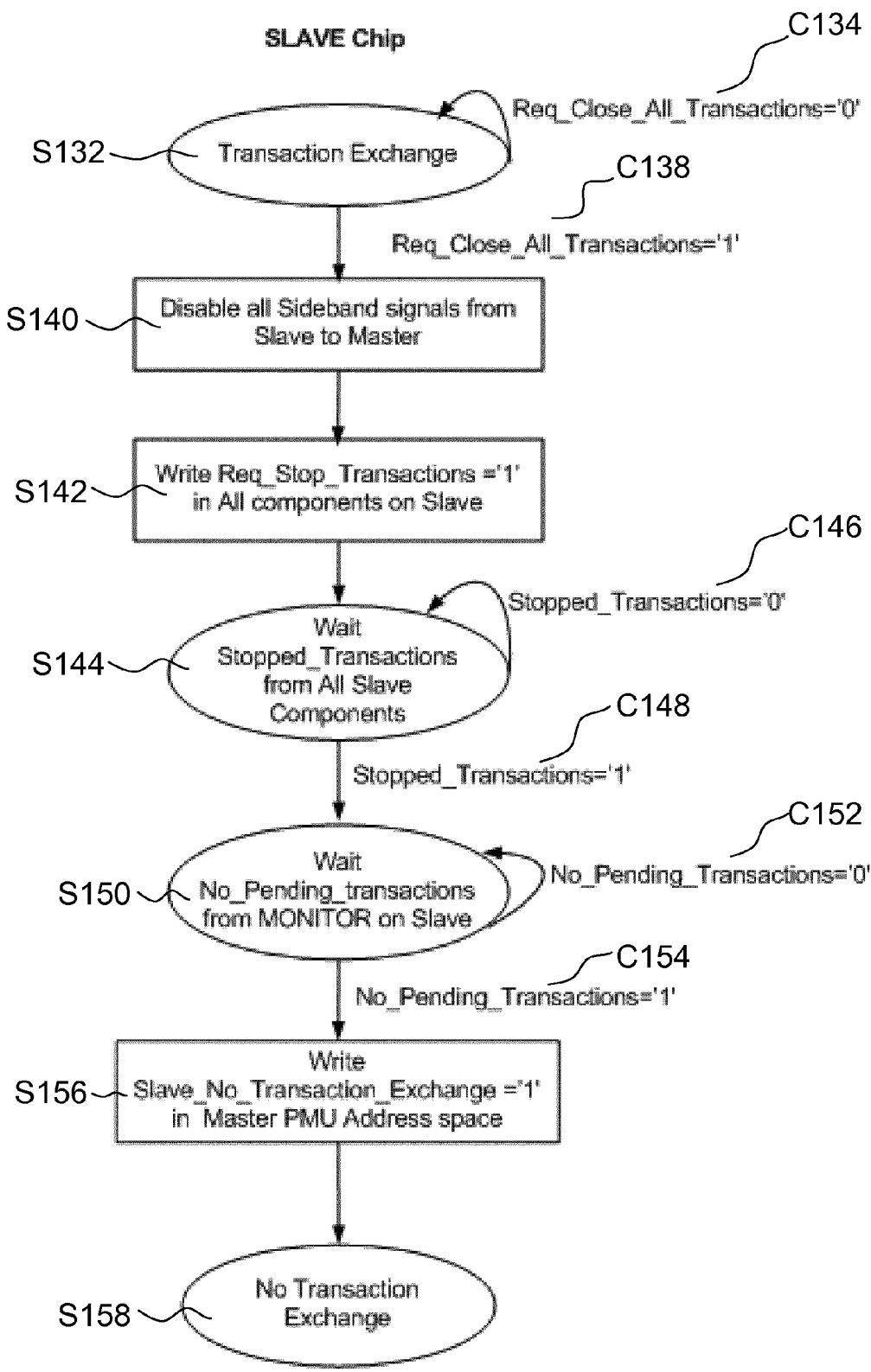

The method for controlling transaction exchanges between the two ICs 12 and 14 in the system 10 as previously described will now be described in the specific cases of FIG. 3 of 4, wherein one IC is the master IC 12 while the other one is the slave IC 14. FIGS. 3 and 4 are schematic flowcharts of an example of method used to reliably know that there are no pending transactions initiated either from an IC or the other. As seen before, the information about the existence of pending transactions can be used to power down the link or put the LLI link in a low power state or by any other function which needs to know that the link is idle.

More specifically, FIG. 3 is an illustration of the relevant steps of the method concerning the master IC 12 whereas FIG. 4 illustrates the relevant steps of the method for the slave IC 14. For clarity purposes, the preceding and subsequent steps are not shown. The steps correspond to machine state. It is assumed that such steps are implemented in a software running on the controller of both ICs 12 and 14. In particular, they may be implemented in a power management unit (also known by the acronym PMU) of the controller. However, it should be understood that other embodiments may be used. For instance, such steps may be run on any other component or even implemented in hardware.

In FIG. 3, the method starts from the step S100 labelled transaction exchange. In fact, this step S100 of transaction state encompasses several steps that are carried out by the master IC 12, the steps not being detailed so as to keep a readable figure. In this step S100 of transaction exchange, the LLI Link is mounted (or booted up) the system memory map is set up and components on both master IC 12 and slave IC 14 are exchanging transactions. The transactions are mapped on either LL or BE or both traffic classes of LLI. In addition, sidebands signals may be converted into service transactions and transmitted to the slave IC 14, and vice versa for the master IC, i.e. converting master IC sideband signals to SVC transactions and transmitting those to the other IC, here the slave IC.

The method remains at the step S100 of transaction exchange as long as the condition C102 is fulfilled. The condition C102 corresponds to the fact that the Req_Close_All_Transactions signal is equal to '0'. The Req_Close_All_Transactions signal may be a hardware signal or an interrupt if the master IC 12 writes into a register on the PMU. The method works irrespective of how the trigger signals are implemented and hence hereafter only the trigger conditions are emphasized (and not their precise implementation) to transition from one state to another.

When the condition C102 is not fulfilled, this means that the condition C104 is fulfilled. Indeed, the condition C104 corresponds to the fact that the Req_Close_All_Transactions signal is equal to '1'. The passage from condition C102 fulfilled to condition C104 fulfilled is ensured by the controller 40 which asserts the Req_Close_All_Transactions signal to '1'. In the remainder of the description, the verb 'to assert' should be understood as changing a signal value to 1. When the condition C104 is fulfilled, according to the method of the flowchart of FIG. 3, the master IC 12 carries out the step S106 of disabling all the sideband signals from master IC 12 to slave IC 14.

The method also comprises a step S108 wherein the master IC 12 writes to the slave IC's PMU address space to assert the Req_Close_All_Transactions signal on the slave IC 14. This is possible as slave IC's PMU is memory mapped and hence master IC's PMU can directly write into the slave IC's address space using the LL or BE transaction. Service transactions (which could be seen as belonging to a third traffic class in LLI) may be used to write into the slave IC LLI IP's signaling address space. This space can indeed be issued an interrupt (Req_Close_All_Transactions signal) to the Slave PMU. The Reponses to Service Transactions are issued by LLI IP and it is reliable due to LLI flow control and re-transmission mechanisms.

The method also encompasses a step S112 wherein the master IC 12 waits for the slave's indication "No_Transaction_Exchange" and remains at this step S112 as long as this indication has not been received. This is ensured by a condition C110 which corresponds to the fact that the "No_Transaction_Exchange" signal is equal to '0'.

In FIG. 4, the method starts with similar steps S132 and S140 for slave IC 14 compared to step S100 and S106 as previously described for the master IC 12. The only difference is that step S140 is associated to disabling the sideband signals from slave IC 14 to master IC 12. In addition, conditions C134 and C138 are also similar respectively to the conditions C102 and C104. The passage from condition C134 fulfilled to condition C138 fulfilled is achieved when master IC 12 is at step S108.

The method of flowchart of FIG. 4 further comprises a step S142 of writing into the address spaces of the components that use the LLI link on the slave IC 14 to assert Req_Stop_Transactions signal in each component. For components that contain no software, the signal can be a hardware signal. In the case of FIG. 1, the components concerned by step S142 are the third component 28, the fourth component 30 and the PMU 32.

Then the slave IC 14 transitions into step S144. The step S144 is a waiting step. The slave IC 14 waits the transactions to be stopped in all the slave components. Each slave components upon the receiving the indication to stop all transactions, takes necessary steps to check if no new transactions need to be initiated to put the component in a safe state and when it determines this is the case, it will acknowledge this by asserting the Stopped_Transactions signal (by either writing into dedicated register bit in the PMU or using a hardware signal). Slave components that do not have the capability to check if it needs more transactions, can immediately assert this signal as it can be assumed that such components are not put into unstable condition by closing the LLI link.

The slave IC 14 remains at step S144 as long as condition C146 is fulfilled. Such condition C146 corresponds to the fact that the stopped_transaction signal is equal to '0'. Once the Slave IC 14 receives "Stopped_Transactions" signal assertion from all components that are capable of initiating transactions, the stopped_transaction signal becomes equal to '1'. Condition C148 thus becomes fulfilled since condition C148 corresponds to the fact that the stopped_transaction signal becomes equal to '1'.

The slave IC 14 then carries out step S150 of waiting that there are no more pending transactions from monitor 38 on slave IC 14. The slave IC 14 remains at step S150 so long as condition C152 is fulfilled. According to the example of FIG. 3, condition C152 corresponds to the fact that the No_Pending_Transaction signal is equal to '0'. When monitor 38 is implemented inside the LLI IP, it can set a No_pending_transaction attribute in the Control and Status Attribute space in the slave LLI attribute/register space. The slave LLI IP can generate an interrupt to the slave PMU when this particular attribute is set by the monitor 38 This interrupt is issued after the slave PMU requests the latest status of the monitor 38 while it remains at step S150. This is one possible way to obtain a No_Pending_Transactions signal. However, other implementations may be considered.

Once condition C152 is not anymore fulfilled or seen in another way, condition C154 becomes fulfilled. Indeed, condition C154 corresponds to the fact that the No_Pending_Transaction signal is equal to '1'. The slave IC 14 then carries out step S156 of the method according to flowchart of FIG. 3. This step S156 comprises writing that slave_No_Transaction_Exchange register bit on the master PMU address space is equal to '1'.

Then, the slave IC 14 transitions to the step S158 which is labeled no transaction exchange. Although the transaction executed at step S156 will receive a response, the slave IC 14 may transition to the step S158 at once since the aim of such step is to make sure that all other components are in steady state. Similarly to the case of step S108 wherein the slave address space is written on, the slave IC's PMU can write into the master IC's address space using the LL or BE transactions. An interrupt ("Slave_No_Transaction_Exchange" signal trigger) may thus be issued.

Once the master IC 12 receives the slave_no_Transaction_Exchange signal assertion triggered at step S156 by the slave IC 14, the "slave_no_transaction_exchange" signal passes from '0' to '1'. Thus, instead of condition C110, condition C114 (which corresponds to the "slave_no_transaction_exchange" signal being equal to '1') becomes fulfilled.

The master PMU then carries out a step S116 of writing that 'Req_Stop_Transactions' signal is equal to '1' into the address space of all the components that use the LLI Link on the master IC 12.

Then, the master IC 12 transitions into a step S120 of waiting that the value of the 'stopped_transactions' is equal to '1' for all the components that use the LLI link on the master IC 12. This implies that the master IC 12 remains at step S120 so long as the condition C118 (the value of the 'stopped_transactions' is equal to '0' at least for one component) is fulfilled. Another way of expressing this idea is that the master IC 12 remains at step S120 so long as the condition C122 (the value of the 'stopped_transactions' is equal to '1' for all component) is not fulfilled Each component of the IC 12 upon receiving the indication to stop all transactions, takes necessary steps to check if new transactions need to be initiated to put the component in a safe state. When a component of the IC 12 determines this is the case, it acknowledges this by asserting the Stopped_Transactions signal. In this specific context, asserting may be achieved by either writing into dedicated register bit in the PMU or using a hardware signal. Components of the IC 12 that do not have the capability to check if it needs more transactions, can immediately assert a 'stopped_transactions' signal equal to '1'. Indeed, it can be assumed that such components are not put into unstable condition by closing the LLI link.

Once the condition C122 is fulfilled, the master IC 12 transitions to a step S126 of waiting that there are no more pending transactions from monitor 26 on master IC 12. The master IC 12 remains at step S126 so long as condition C124 is fulfilled. According to the example of FIG. 2, condition C124 corresponds to the fact that the No_Pending_Transaction signal is equal to '0'. When the monitor 26 is implemented inside the LLI IP, it can set a No_pending_transaction attribute in the Control and Status Attribute space in the master LLI attribute/register space. The master LLI IP can generate an interrupt to the master PMU when this particular attribute is set by the monitor 26. This interrupt is issued after the master PMU requests the latest status of the monitor 26 while it remains at step S126. This is one possible way to obtain a No_Pending_Transactions signal. However, other implementations may be considered.

Once condition C124 is not anymore fulfilled or seen in another way, condition C128 becomes fulfilled. Indeed, condition C128 corresponds to the fact that the No_Pending_Transaction signal is equal to '1'. The master IC 12 then carries out step S130 which is labeled no transaction exchange. At this step, the master PMU or its logic equivalent is certain that all the components on the master IC 12 and the slave IC 14 are in safe and/or steady state.

Therefore, at this step, the LLI link can be powered down or put in a low power state without causing any instability in the system 10.

It should be understood that the method of flowcharts of FIGS. 3 and 4 is only an illustrative method. Notably, the person skilled in the art may adapt some steps or re-order some of the steps in the method to achieve the same objective. For instance, step S106 of disabling of the sideband signals from master IC 12 to Slave IC 14 may be achieved after step S112 wherein the master IC 12 gets the trigger to change the value of slave_no_transaction_exchange the signal. Another possibility is that the master IC 12 may first request all its components to execute (=complete) its transactions before requesting the slave IC 14 to do the same on it side. Furthermore, knowing that components of an IC have no transactions to exchange can serve as a precursor to power down the Interconnect on the IC.

In every embodiment, the method may be performed in a system 10 comprising the two integrated circuits 12 and 14, the power supply for powering a link between the two integrated circuits 12 and 14, thereby enabling transaction exchanges between both integrated circuits 12 and 14 and the controller 40 for controlling the integrated circuits and the power supply. The controller 40 is adapted to send an instruction to both integrated circuits 12 and 14 to prevent the ICs 12 and 14 from initiating new transactions when receiving an order to lower an amount of the power supplied by the supply power to the link and to lower the power supplied by the supply power to the link once any pending transactions have been executed. As mentioned, the controller 40 might only be present in a master IC (from where it then can control the PMU in the slave, effectively being a virtual controller 40 in the slave IC, see FIG. 1.

Such controller 40 may be further adapted to send an instruction to both integrated circuits 12 and 14 to prevent the ICs 12 and 14 from initiating new transactions when receiving an order to power down the link and to stop the power supply of the link once any pending transactions have been executed.

Further, in every embodiment, the method may be performed based on a computer program comprising instructions for performing the method. The program is executable on a programmable device. The application program may be implemented on a high-level procedural or object-oriented programming language, or in assembly or machine language if desired. In any case, the language may be compiled or interpreted language. The program may be a full installation program, or an update program. In the latter case, the program is an update program that updates a programmable device, previously programmed performing parts of the method, to a state wherein the device is suitable for performing the whole method.

The program may be recorded on a data storage medium. The data storage medium may be any memory adapted for recording computer instructions. The data storage medium may thus be any form of nonvolatile memory, including by way of example semiconductor memory devices, such as EPROM, EEPROM, and flash memory devices; magnetic disks such as internal hard disks and removable disks; magneto-optical disks; and CD-ROM disks.

The invention has been described with reference to preferred embodiments. However, many variations are possible within the scope of the invention.

APPENDICE I

TABLE OF ACRONYMS

| ACRONYMS | MEANING |
|---|---|
| ARM | Advanced RISC Machines ® |
| AXI | Advanced eXtensible Interface |
| BE | Best Effort |
| CPU | Central Processor Unit |
| DMA | Direct Memory Access |
| EPROM | Erasable Programmable Read-Only Memory |
| EEPROM | Electrically Erasable Programmable Read-Only Memory |
| IC | Integrated Circuit |
| IP | Intellectual property |
| LL | Low Latency |
| LLI | Low Latency Interface |
| MIPI | Mobile Industry Processor Interface |
| NoC | Network on Chip |
| OCP | Open Core Protocol |
| PMU | Power Management Unit |
| SoC | System-on-a-chip |
| SOC | system on chip |
| UART | Universal Asynchronous Receiver Transmitter |

The invention claimed is:

1. A method for controlling transaction exchanges between two integrated circuits in a system comprising:
the two integrated circuits,
a power supply for supplying power to a link between the two integrated circuits, thereby enabling transaction exchanges between both integrated circuits, and
a controller controlling the integrated circuits and the power supply, the method comprising the steps of:
receiving an order at the controller, wherein the order requires the link to be closed; and
in response to the order, first stopping initiation of new transaction requests and subsequently closing the link after all pending transactions of both of the two integrated circuits have been executed by:
sending an instruction from the controller to each of the two integrated circuits, wherein the instruction causes each of the two integrated circuits to stop initiating new transaction requests;
for each one of the two integrated circuits, detecting that the one of the two integrated circuits has stopped initiating new transactions, and in response to detecting that the one of the two integrated circuits has stopped initiating new transactions, detecting when all pending transactions initiated by the one of the two integrated circuits have been executed; and
closing the link in response to detecting that all pending transactions of both of the two integrated circuits have been executed.

2. The method of claim 1, wherein the order is an order to power down the link.

3. The method of claim 1, wherein the link operates in accordance with a circuit-to-circuit serial interface protocol.

4. The method of claim 1, wherein the link operates in accordance with a Mobile Industry Processor Interface (MIPI) Low Latency Interface.

5. The method of claim 1, wherein at least one of the integrated circuits has an interconnect to which power is supplied by an interconnect power supply, which is only used in the transaction exchanges between the two integrated circuits and wherein closing the link comprises lowering the power supplied by the interconnect power supply in response to detecting that all pending transactions of both of the two integrated circuits have been executed.

6. The method of claim 5, wherein lowering the power supplied by the interconnect power supply comprises powering down the interconnect power supply.

7. The method of claim 1, wherein one of the integrated circuits is a master integrated circuit and the other one of the integrated circuits is a slave integrated circuit.

8. The method of claim 1, wherein the system comprises at least one monitor able to provide a signal representative of a number of pending transactions, and wherein detecting when all pending transactions initiated by the one of the two integrated circuits have been executed comprises sending the signal from the monitor of the one of the two integrated circuits to the controller when the number of pending transactions reaches zero.

9. A system comprising:
two integrated circuits;
a power supply configured to supply power to a link between the two integrated circuits, thereby enabling transaction exchanges between both of the two integrated circuits;
a controller configured to control the two integrated circuits and the power supply;
wherein the controller is configured to respond to an order by:
in response to the order, first stopping initiation of new transaction requests and subsequently closing the link after all pending transactions of both of the two integrated circuits have been executed by:
sending an instruction to each of the two integrated circuits, wherein the instruction causes each of the two integrated circuits to stop initiating new transaction requests;
causing each one of the two integrated circuits to detect that the one of the two integrated circuits has stopped initiating new transactions, and in response to detecting that the one of the two integrated circuits has stopped initiating new transactions, detect when all pending transactions initiated by the one of the two integrated circuits have been executed; and closing the link in response to detecting that all pending transactions of both of the two integrated circuits have been executed, wherein the order is an order that requires the link to be closed.

10. The system according to claim 9, wherein the order that requires the link to be closed is an order to power down the link, and wherein the controller is configured to stop the power supply of the link in response to detecting that all pending transactions of both of the two integrated circuits have been executed.

11. The method of claim 1, comprising:
at least one component on at least one of the two integrated circuits performing:
receiving, from the controller, the instruction that causes each of the two integrated circuits to stop initiating new transaction requests;
in response to the received instruction, continuing to initiate new transaction requests only until the at least one component has transitioned into a predefined safe state; and
in response to the at least one component having transitioned into the predefined safe state, notifying the controller that the at least one component has stopped initiating new transactions.

12. The system of claim 9, comprising:
at least one component on at least one of the two integrated circuits configured to perform:
receiving, from the controller, the instruction that causes each of the two integrated circuits to stop initiating new transaction requests;
in response to the received instruction, continuing to initiate new transaction requests only until the at least one component has transitioned into a predefined safe state; and
in response to the at least one component having transitioned into the predefined safe state, notifying the controller that the at least one component has stopped initiating new transactions.

13. The method of claim 1, wherein the order is an order to lower the power supplied to the link.

14. The system of claim 9, wherein the order is an order to lower the power supplied to the link.

15. The method of claim 8, wherein the monitor comprises an up/down counter configured to count in one of two directions in response to initiation of a transaction request, and to count in another of the two directions in response to receipt of a transaction response.

16. The system of claim 9, comprising at least one monitor configured to generate representation of a number of pending transactions and to send a signal to the controller when the number of pending transactions reaches zero,
wherein the monitor comprises an up/down counter configured to count in one of two directions in response to initiation of a transaction request, and to count in another of the two directions in response to receipt of a transaction response.

17. The method of claim 1, comprising using an interrupt mechanism to inform the controller that all pending transactions initiated by the one of the two integrated circuits have been executed.

18. The system of claim 9, comprising an interrupt mechanism configured to inform the controller that all pending transactions initiated by the one of the two integrated circuits have been executed.

19. A non-transitory processor readable storage medium having stored therein instructions that, when executed by a processor, cause the processor to perform a method for controlling transaction exchanges between two integrated circuits in a system comprising:
the two integrated circuits,
a power supply for supplying power to a link between the two integrated circuits, thereby enabling transaction exchanges between both integrated circuits, and
a controller controlling the integrated circuits and the power supply, wherein the method comprises the steps of:
receiving an order at the controller, wherein the order requires the link to be closed; and
in response to the order, first stopping initiation of new transaction requests and subsequently closing the link after all pending transactions of both of the two integrated circuits have been executed by:
sending an instruction from the controller to each of the two integrated circuits, wherein the instruction causes each of the two integrated circuits to stop initiating new transaction requests;
for each one of the two integrated circuits, detecting that the one of the two integrated circuits has stopped initiating new transactions, and in response to detecting that the one of the two integrated circuits has stopped initiating new transactions, detecting when all pending transactions initiated by the one of the two integrated circuits have been executed; and
closing the link in response to detecting that all pending transactions of both of the two integrated circuits have been executed.

* * * * *